United States Patent
Bandyopadhyay et al.

(10) Patent No.: US 11,194,783 B2
(45) Date of Patent: Dec. 7, 2021

(54) MULTIPLE PARAMETER BASED COMPOSITE RULE WISE DATA VALIDATION IN CLOUD HYBRID MODEL

(71) Applicant: INTERNATIONAL BUSINESS MACHINES CORPORATION, Armonk, NY (US)

(72) Inventors: Santanu Bandyopadhyay, Kolkata (IN); Ramesh Chandra Pathak, Bangalore (IN); Suryanarayana Rao, Bangalore (IN); Vishal Anand, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 62 days.

(21) Appl. No.: 16/122,225

(22) Filed: Sep. 5, 2018

(65) Prior Publication Data

US 2020/0073979 A1 Mar. 5, 2020

(51) Int. Cl.
*G06F 16/23* (2019.01)
*H04L 29/08* (2006.01)
*G06N 20/00* (2019.01)
*G06F 16/835* (2019.01)

(52) U.S. Cl.
CPC ........ *G06F 16/2365* (2019.01); *G06F 16/835* (2019.01); *G06N 20/00* (2019.01); *H04L 67/10* (2013.01); *H04L 67/2809* (2013.01)

(58) Field of Classification Search
CPC ................................................. G06F 16/2365
See application file for complete search history.

(56) References Cited

U.S. PATENT DOCUMENTS

| | | | |
|---|---|---|---|
| 7,146,422 B1 * | 12/2006 | Marlatt | ................ G06F 40/226 709/227 |
| 7,366,977 B2 | 4/2008 | Chokshi | |
| 8,001,525 B2 | 8/2011 | Agostini et al. | |
| 8,064,703 B2 | 11/2011 | Newcomer et al. | |
| 8,468,167 B2 | 6/2013 | Sathyanarayana et al. | |
| 8,996,980 B2 | 3/2015 | Choksi | |
| 9,043,458 B2 | 5/2015 | Balaji et al. | |

(Continued)

FOREIGN PATENT DOCUMENTS

| WO | 01/57720 A2 | 8/2001 |
|---|---|---|
| WO | 2015/138666 A1 | 9/2015 |

*Primary Examiner* — Grace Park
(74) *Attorney, Agent, or Firm* — Tutunjian & Bitetto, P.C.; Ken Han (57) ABSTRACT

A method for validating data in a hybrid cloud model that includes providing a validation layer in the brokerage module of the hybrid architecture. The validation layer is separate from an applications layer of the hybrid architecture. The method includes sending target object values to a centralized brokerage layer composite query generator (BLCQG) component of the validation layer from an application needing validation of target data time. The method continues with generating a composite validation rule set with the brokerage layer composite query generator (BLCQG) component based on the parameters of the target object values. The method further includes validating the target data item of the target object values with the composite validation rule in the validation rules validator (VRV) component; and sending the target data item that has been validated to the application.

20 Claims, 7 Drawing Sheets

(56) References Cited

U.S. PATENT DOCUMENTS

| | | |
|---|---|---|
| 9,152,627 B2 | 10/2015 | Kung et al. |
| 9,210,030 B1 | 12/2015 | Miller et al. |
| 9,813,378 B2 | 11/2017 | Wu |
| 2007/0005786 A1* | 1/2007 | Kumar .................. H04L 45/563 709/230 |
| 2012/0272221 A1 | 10/2012 | Pessoa et al. |
| 2013/0067308 A1 | 3/2013 | Chokshi |
| 2013/0067309 A1 | 3/2013 | Chokshi |
| 2015/0161193 A1 | 6/2015 | Damodar et al. |
| 2015/0261796 A1 | 9/2015 | Gould et al. |
| 2015/0261824 A1 | 9/2015 | Jha |
| 2017/0019314 A1 | 1/2017 | Chieu et al. |
| 2017/0041189 A1* | 2/2017 | Aswathanarayana ........................ H04L 41/0843 |
| 2017/0116303 A1 | 4/2017 | Kolli et al. |
| 2020/0012553 A1* | 1/2020 | Subhedar ............ G06F 12/0802 |

* cited by examiner

MULTIPLE PARAMETER BASED COMPOSITE RULE WISE DATA VALIDATION IN CLOUD HYBRID MODEL

BACKGROUND

Technical Field

The present disclosure relates to cloud computing, and in some embodiments to hybrid cloud computing.

Description of the Related Art

Hybrid cloud, which is a combination of a public and private cloud solutions. It can be thought of as connecting a public cloud to an in-house data center. Combining public and private clouds into a hybrid cloud brings its own set of pros and cons. The downside of a hybrid cloud is that it is a more complex undertaking with a blend of resources across multiple platforms, and that requires a higher level of knowledge to manage and support it. There can also be latency concerns as data is shuffled between the private and public portions of the cloud. Attention must also be paid to the data center that supports the private cloud portion of the hybrid cloud, with appropriate choice of hardware in terms of the servers, storage, the network connecting everything, and load balancers for traffic management to keep it all running smoothly. However, the big upside is that a hybrid solution offers more choice in available resources, with the ability to use the best of each of the other solutions. It also offers a higher degree of scalability, with the potential to share resources as needed. Finally, the public cloud component facilitates easier access for mobile and remote workers with a hybrid cloud solution, compared to a private cloud-only solution.

SUMMARY

In one aspect, the present disclosure provides a method for validating data in a hybrid cloud model that includes providing a validation layer in the hybrid architecture, wherein the validation layer being separate from an applications layer of the hybrid architecture. The method further includes sending target object values to a composite query generator (CQG) component of the validation layer from an application needing validation of target data time. The method continues with generating a composite validation rule set with the composite query generator (CQG) component based on the parameters of the target object values from the application needing validation of data; and storing the composite validation rule set in a validation rules validator (VRV) component. The method further includes Validating the target data item of the target object values with the composite validation rule in a validation rules validator (VRV) component; and sending the target data item that has been validated to the application.

In another embodiment, a system for validating data in a hybrid cloud model is provided. In one embodiment, the system for validating data in a hybrid cloud model includes a validation layer in the hybrid architecture, in which the validation layer is separate from the applications layer of the hybrid architecture. The system may also include a composite query generator (CQG) component of the validation layer for receiving target object values from an application needing validation of target data time and generating a composite validation rule set with the composite query generator (CQG) component based on the parameters of the target object values from the application needing validation of data. In some embodiments, the system further includes a validation rules validator (VRV) for validating the target data item of the target object values with the composite validation rule.

In yet another aspect, a computer program product is provided for validating data in a hybrid cloud model. In one embodiment, the computer program product includes a non-transitory computer readable storage medium having computer readable program code embodied therein for validating data in a hybrid cloud model. The validating data method including providing a validation layer in the brokerage module of the hybrid architecture, the validation layer being separate from the applications layer; and sending target object values to a composite query generator (CQG) component of the validation layer from an application needing validation of target data time. The method may further include generating a composite validation rule set with the composite query generator (CQG) component based on the parameters of the target object values from the application needing validation of data; validating the target data item of the target object values with the composite validation rule in a validation rules validator (VRV) component; and sending the target data item that has been validated to the application.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Detailed embodiments of the claimed methods, systems and computer program products that are disclosed herein; however, it is to be understood that the disclosed embodiments are merely illustrative of the claimed structures and methods that may be embodied in various forms. In addition, each of the examples given in connection with the various embodiments are intended to be illustrative, and not restrictive. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the methods, system and computer program products of the present disclosure.

"Cloud computing" is the practice of using a network of remote servers hosted on the Internet to store, manage, and process data, rather than a local server or a personal computer. "Hybrid cloud" is a cloud computing environment that uses a mix of on-premises, private cloud and third-party, public cloud services with orchestration between the two platforms. Hybrid cloud may be referred to herein as a "cloud hybrid model". In a client server application in a Cloud Hybrid Model there is often requirement to validate a particular target data item of a target data object against composite validation rules which is specific for an individual application deployed as a service in the Hybrid Model. Object storage (also known as object-based storage), i.e., data objects, is a computer data storage architecture that manages data as objects, as opposed to other storage architectures like file systems which manage data as a file hierarchy, and block storage which manages data as blocks within sectors and tracks. Each object typically includes the data itself, a variable amount of metadata, and a globally unique identifier. Object storage can be implemented at multiple levels, including the device level (object-storage device), the system level, and the interface level. In each case, object storage seeks to enable capabilities not addressed by other storage architectures, like interfaces that can be directly programmable by the application, a namespace that can span multiple instances of physical hardware, and data-management functions like data replication and data distribution at object-level granularity. A data item may be the data itself of the data object.

By "composite validation rules" it is meant to refer to the situation where one/multiple validation rule (s) are required to be applied on a target data item based on the values of multiple parameters controlling the data processing of the application.

Some forms of target data validation are based on simple validation rule/rules. This approach can use simple validation rules to validate dates, such as:
a) Validate target data A of the target data of the target object.
b) Use validation rule criteria X to validate the target data of the target object.

However, it has been determined that this approach will fail for composite validation rules. For example, it has been determined that this approach cannot validate the data if the target data item of the target object needs to be validated against criteria X1 when the values are Submitted to Buyer (request state), RIPC (role), document state (in progress) or combinations thereof.

In another form of target data validation, complex coding logic may be employed. This approach can employ the following steps:
a) Validate target data A of the target data of the target object.
b) Use validation rule criteria X to validate the target data of the target object.
c) Get all the validation result configured for that target data item for the data object.
c) Hard code the composite logic with if else algorithm and pick up the validation result. The problem with this approach is this method makes the system unnecessarily complex. Moreover, this solution will reside along with the software as a service (SaaS), which will be using the validation layer in the Hybrid Model. As a result, the application becomes unmanageable and very costly. Moreover, this approach makes the application much more error prone.

In summation, the aforementioned methods do not provide the option to validate any target data item of a target data object based on logical composite validation rules which can be reused by heterogenous software as service (SaaS) based application in the Hybrid Model. Additional coding cannot be integrated with the existing methods to obtain composite validation rule-based validation because that will make the application much more complex than necessary and unmanageable. This will also increase the cost per usage of each application residing as SaaS in the Hybrid Model of the cloud.

The methods, systems and computer program products of the present disclosure provide a solution to the disadvantages of existing methods that have become unnecessarily complex to validate any target data of any target based on constituent parameters and their values in a Cloud Hybrid Model. Validating target data, i.e., data validation, validation means checking the accuracy and quality of source data before using, importing or otherwise processing data. Data validation is a form of data cleansing. When moving and merging data it's important to make sure that the data from different sources and repositories conform to business rules and not become corrupted due to inconsistencies in type or context. The goal is to create data that is consistent, accurate and complete so to prevent data loss and errors during a move.

The layer that provides validation of target data in the cloud hybrid model is a separate validation layer in the brokerage module of the hybrid architecture so that validation layer and application(s) layer deployed as a software as a service (SaaS) can evolve independently. In some embodiments, the application requiring validation will send via XML or JSON the target object values and constituent element values to a centralized brokerage layer composite query generator (BLCQG) component. In some embodiments, the BLCQG will then analyze the different parameters required for a composite validation rule, and will generate the corresponding composite validation rule set. The composite validations rules generated will be stored in the data model for further synthesis by a Brokerage Validation Rules Validator (BVRV) Component of the layer that provides validation of target data in the cloud hybrid model. The composite validation rules synthesized by the BVRV validate the target data item of the target object. In some embodiments, the brokerage validation rules validator (BVRV) will return the validation result to BLCQG which in turn will return the result to the application. The applications residing as SaaS in the Hybrid Architecture will be using this validation layer instance which resides in the brokerage module which in turn will reduce the usage cost of the existing application. The methods, systems and computer program products that are described herein can offer a machine learning feature for the cases which is in turn used for Cognitive suggestion for the primary validation rules of a target data item based on its data type. The methods, systems and computer program products of the present disclosure are now described with greater detail with reference to FIGS. 1-7.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
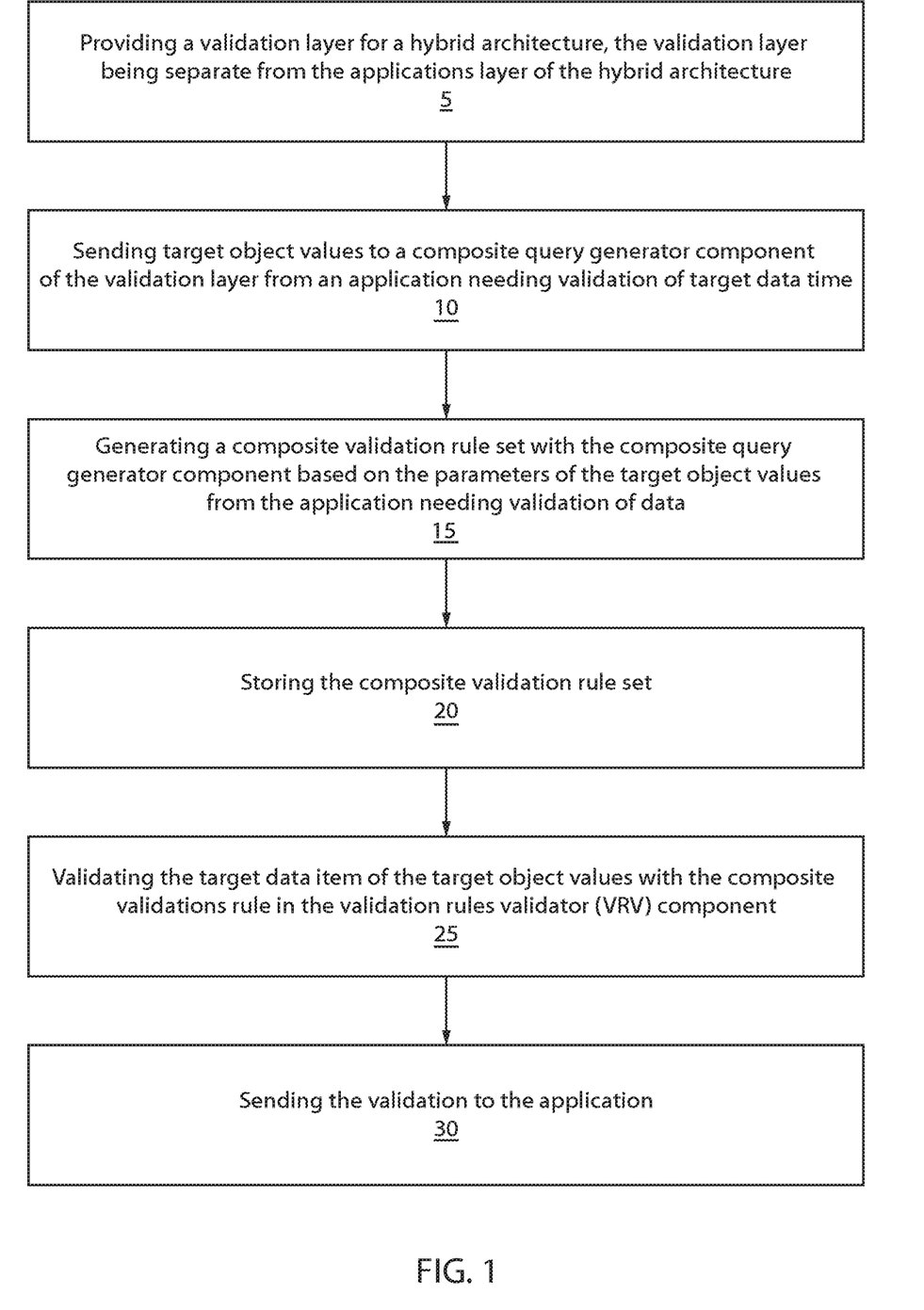
FIG. 1 is a block/flow diagram illustrating a method for validating data in a hybrid cloud model, in accordance with one embodiment of the present disclosure.

FIG. 1 illustrates one embodiment of a method for validating data in a hybrid cloud model. In any client server application in the cloud hybrid model there is often a requirement to validate a particular target data item of a target data object again composite validation rules which are specific for an individual application deployed as a service in the hybrid model.

By composite validation rules it is meant to refer to the situation where one/multiple validation rules are required to be applied on a target data item based on the values of multiple parameters controlling the data processing of the application. In some examples of composite validation, a data processing application is provided where any particular target data of a target objects will be validated based on the values of multiple parameters, such as request state, user role, document state against certain validation criteria and combinations thereof. In this example, the composite validation rule will be formed based on the values of request state, user role, document state, etc., in which the constituent parameter values are identified on the run time. It has been determined that heterogeneous SaaS applications in the hybrid cloud model can become unnecessarily complex, and costly, when validating target data items on target objects based on constituent elements and their values, e.g., request state, user role, document state against certain validation criteria and combinations thereof, which controls the flow of a particular software as a service (SaaS) application. The method, system and computer program products provides that validations can be performed without hardcoding the logic inside the applications.

Referring to FIG. 1, the method may include providing a validation layer in the brokerage module of the hybrid architecture at block 5. The brokerage modules can manage the use, performance and delivery of cloud services, and negotiates relationships between the different cloud providers, i.e., private cloud and public cloud within the hybrid cloud architecture, and cloud consumers. In some embodiments, the validation layer is separate from the applications layer. The application layer is the location of the applications for the software as a service (SaaS) elements for cloud computing architecture. In some embodiments, the validation layer in the brokerage module of the hybrid architecture will remain as a separate validation engine of the hybrid architecture so that the validation engine can evolve independently irrespective of heterogeneous SaaS applications which use this validation engine.

Referring to FIG. 1, at block 10, the method may continue with sending target object values, i.e., from the client 40 running the application, i.e., SaaS application, to a centralized brokerage layer composite query generator (BLCQG) component 50 of the validation layer from an application needing validation of target data. The software as a service (SaaS) may be in the fields of a contractor sourcing application (CSA), human resources management software (HRMS), and Interlanguage communication (ILC) application, as well as similar applications that are employed in SaaS environments.

More specifically, in some embodiments, the application, i.e., SaaS application being run by the client 40, requiring validation will send, e.g., via XML or JSON, the target object values and constituent element values to the centralized composite query generator (LCQG) component 50. Constituent element values are the value of the elements which controls the data processing of an application.

Figure 2:
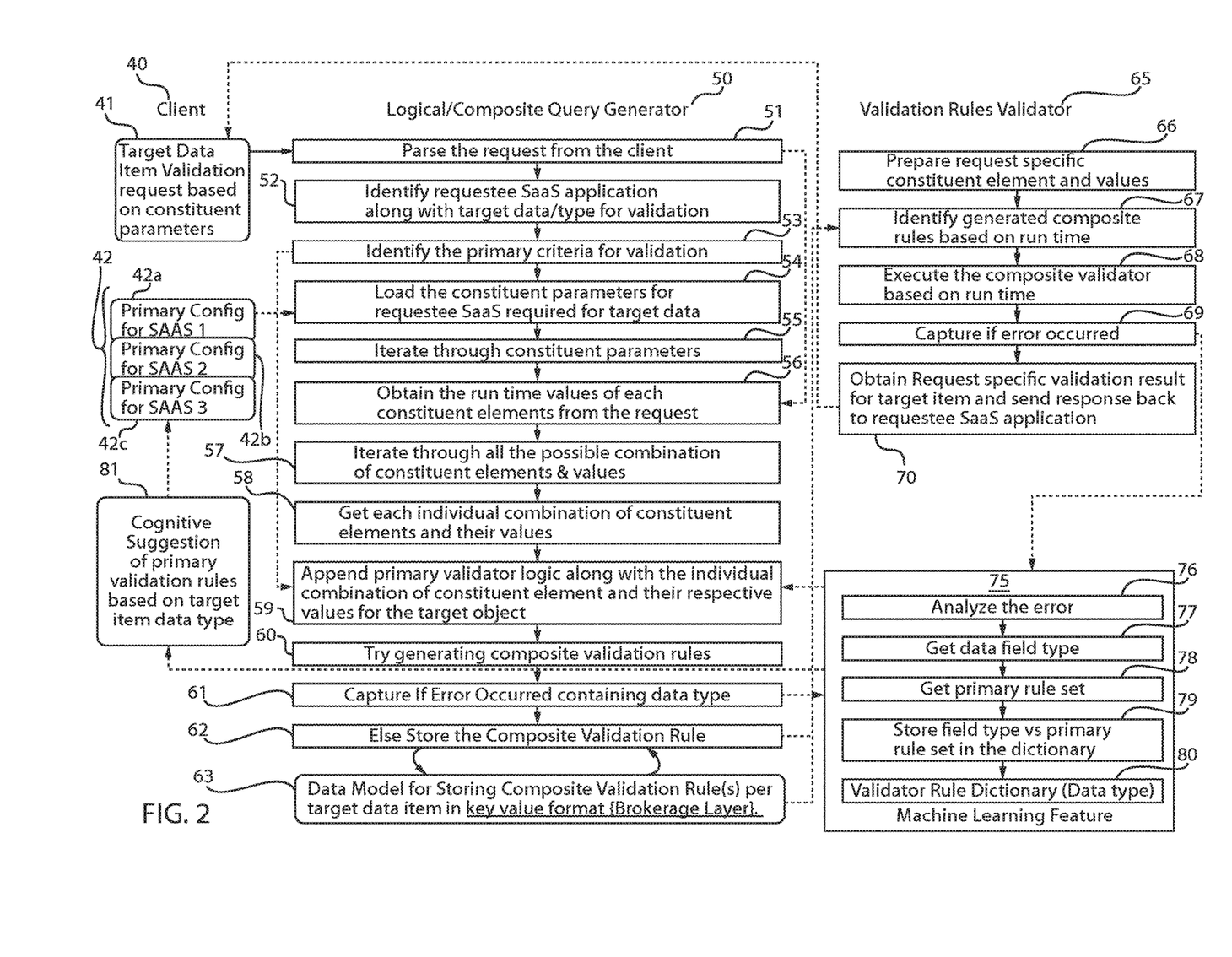
FIG. 2 is a sequence diagram illustrating functions of the client, the logical composite query generator and the validation rules validator of a hybrid could model, in accordance with one embodiment of the present disclosure.

FIG. 2 illustrates a sequence diagram depicting the functions of the client 40, the logical composite query generator 50 (the logical composite query generator 50 may also be referred to as the logical composite query generator 50) and the validation rules validator 65 of a hybrid cloud model. FIG. 2 illustrates a target data item validation request based on constituent parameters being at block 41 being sent to the logical composition query generator (LCQC) 50 from the client 40. Examples of constituent parameters for a contractor sourcing application (CSA) as the software as a service (SaaS) may include the request state, the user role (i.e., client role), and document state values, as well as combinations thereof, and other like constituent parameters.

Examples of constituent parameters for a human resources management software (HRMS) as the software as a service (SaaS) may include employee type and employee job values, as well as combinations thereof, and other like constituent parameters. Examples of constituent parameters for an Interlanguage communication (ILC) application as the software as a service (SaaS) may include user type and login data values, as well as combinations thereof, and other like constituent parameters. Examples of constituent parameters for a contractor sourcing application (CSA) as the software as a service (SaaS) may include the request state, the user role (i.e., client role), and document state values, as well as combinations thereof, and other like constituent parameters.

Referring to FIG. 1, the method further includes generating a composite validation rule set with the brokerage layer composite query generator (BLCQG) component 50 based on the parameters of the target object values from the application needing validation of data at block 15. Generating the composite validation rule set is further depicted in FIG. 2. For example, in some embodiments, beginning with the receipt of the target validation request from the client 40 from block 41, the logical composite query generator 50 can parse the request from the client at block 51. The parse process begins the process of identifying data from the request. For example, at block 52 the method further includes the brokerage layer composite query generator (BLCQG) component 50 identifying the requestee SaaS application along with the target data/type for validation. At block 53, the brokerage layer composite query generator (BLCQG) component 50 identify the primary criteria for validation. Examples of the primary criteria for validation may include field size, only numbers fields etc. Examples of primary criteria are as follows:
1. Validate a field based on the fileLength (such as Max length should not be geater than 50).
2. A field should be numeric (Character entry should be prohibited).
3. Field is mandatory (Data processing request with empty values for this field will be restricted).
4. Accept Double byte characters (The field will allow double byte characters, Japanese, Korean etc).

Referring to FIG. 2, generating a composite validation rule set with the brokerage layer composite query generator (BLCQG) component 50 may continue to block 54, in which the brokerage layer composite query generator (BLCQG) component 50 loads the constituent parameters for the requestee SaaS required for the target data. In some embodiments, the constituent parameters 42 are received directly from the client 40. FIG. 2 illustrates one embodiment, in which three SaaS applications 42a, 42b, 42c can provide the constituent parameters to block 54 for providing the composite validation rule set with the brokerage layer composite query generator (BLCQG) component 50. For example, a first SaaS application 42a for providing constituent parameters may be contractor sourcing application (CSA), a second SaaS application 42b for providing constituent parameters may be a human resources management software (HRMS), and a third SaaS application 42b for providing constituent parameters may be an Interlanguage communication (ILC) application.

At block 55 of FIG. 2, the method may continue with iterating through the constituent parameters, and at block 56 the brokerage layer composite query generator (BLCQG) component 50 may obtain the run time values of each of the constituent elements from the request. More specifically, at block 56, the brokerage layer composite query generator (BLCQG) component 50 received from block 51 the constituent elements parsed from the request from the client 40. Examples of run time values may include request state, role, and document state, e.g., in progress.

Referring to block 57 of FIG. 2, in generating a composite validation rule set with the brokerage layer composite query generator (BLCQG) component 50, the method may continue with iterating through all the possible combinations of constituent elements and values, e.g., run time values. As illustrated in FIG. 2, the run time values can be provided to block 57 from the actions of block 56.

In some embodiments, the brokerage layer composite query generator (BLCQG) component 50 may then get each individual combination of constituent elements and their respective values for the target object at block 58 of FIG. 2. In a following step at block 59, the brokerage layer composite query generator (BLCQG) component 50 can then append primary validator logic along with the individual combination of the constituent element and their respective values for the target object. In some embodiments, the step of appending in block 59 can consider the primary criteria for validation provided in block 53. In some embodiments, the step of appending the primary validator logic can include consideration of the validator rule dictionary (data type) from a machine learning feature 75, which is a component of a loop that occur when an error occurs in containing data types.

Referring to FIG. 2, following steps 51-59, the composite validation rules are generated at step 60 that is suitable for use with step 15 of FIG. 1. To reiterate, the composite validation rule set is generated based on the parameters of the target object values from the application needing validation of data.

It is noted that in some embodiments, there can be a step of determine whether an error has occurred in the data type. For example, block 61 includes capture if error occurred containing a data type. In some embodiments, if an error has occurred the method can continue by employing a machine learning feature 75, which begins with analyzing the error at block 76, and getting the data field type at block 77. Examples of data filed types include alphanumeric, numeric, only characters and combinations thereof. In a following step of the machine learning feature 75, a primary rule set is established at block 78. The primary rule set and the field type were stored in a dictionary at block 79. The primary rule set and field type are included in the validator rule dictionary (data type) at block 80. The validator rule dictionary at block 80 may be used to append validator logic at block 59 in a loop including blocks 59, 60, 61 and 75 until a set of composite validation rules 60 is generated without an error occurring in the data type.

In some embodiments, the brokerage layer composite query generator (BLCQG) component 50 may then store the composite validation rule at block 62 and 63 of FIG. 2. Block 63 of FIG. 2 includes a data model for storing composite validation rule(s) per target data item in key value format, i.e., the brokerage layer, which is separate from the applications layer.

Referring to FIG. 1, in some embodiments, following generation of the composite validation rule set, the composite validation rule may be stored in a validation rules validator (VRV) component 65 of the brokerage layer of the hybrid cloud architect, at block 20. In some embodiments, the composite validation rules generated will be stored in the data model for further synthesis by the validation rules validator (VRV) component 65.

At block 25 of FIG. 1, the method may continue with validating the target data item of the target object values with the composite validation rule. Validating the target data item of the target object value is conducted in the validation rules validator (VRV) 65. The composite validation rules can be synthesized by the VRV to validate the target data item of the target object.

The method for validating the target data item of the target object values with the composite validation rules in the validation rules validator (VRV) component 65 is further described with reference to FIG. 2, in which the method may begin with preparing a request that is specific to the constituent elements and values at block 66. In a following step, the validation rules validator (VRV) component 65 can identify generated composite rules based on run time at block 67. In some embodiments, this step may include an input from the data model for storing composite validation rule(s) per target data item in key value format (brokerage layer) at block 63.

Still referring to FIG. 2, in some embodiments, the validation rules validator (VRV) component 65 of the brokerage layer, which includes a validation layer that is a separate layer from the applications layer of the hybrid cloud architecture, can then execute the composite validator query against the target data at block 68. In one example, executing the composite validator query at this stage of the process flow considers a data processing application where any particular target data of a target object will be validated based on the values of multiple parameters such as request state, user role, document state against certain validation criteria. So the composite validation rule will be formed based on the values of request state, user role, document state, etc. The constituent parameter values are identified on the run time. The example details are as follows:
Sample Composite validation rules 1: Validate the data with X1 criteria when the values are Draft (request state), RIPC (role), in progress (document state).
Sample Composite validation rules 2: Validate the data with X2 AND X1 criteria when the values are Submitted to Buyer (request state), RIPC (role), in progress (document state)
Sample Composite validation rules 3: Validate the data with X3 AND X1 AND X2 criteria when the values are Draft (request state), RIPC (role), in progress (document state).
Sample Composite validation rules 4: Validate the data with X4 OR X1 criteria when the values are Submitted to Buyer (request state), buyer (role), in progress (document state).
Sample Composite validation rules 5: Validate the data with X5 AND X5 criteria when the values are Draft (request state), RIPC (role), on Hold (document state).
Sample X1/X2 criteria: field size limit, only numbers field etc. X1/X2 are Primary validation Criteria.

In some embodiments, similar to the logical composite query generator 50, the validation rules validator 65 may include a step of determine whether an error has occurred at block 69. In some embodiments, if an error has occurred at block 69, the method can continue by employing a machine learning feature 75, which begins with analyzing the error at block 76. The machine learning feature 75 can determine the presence of an error similar to how the machine learning feature 75 determines the presence of an error in the process flow performed by the logical composite query generator 50.

If it is determined that an error is not present in the process flow run by the validation rules validator 65, the method may continue by obtaining a request specific validation result for a target item and send the response back to the requestee software as a service (SaaS) application at block 70. In some embodiments, this can provide block 30 of FIG. 1, which includes sending validation to the application. In some embodiments, the validation rules validator 65 can return the validation results to the composite query generator (LCQG) 50, which in turn will return the results to the application, i.e., client 40.

In some embodiments, all the application residing as software as a service (SaaS) in the hybrid architecture uses the validation layer, which resides as a reusable module that in turn will reduce the usage cost of the existing application. By separating the validation functions, i.e., validation layer, from the application layer, the methods, systems and computer program products, can increase processing speeds, which increases application run speed in the hybrid cloud architecture. By separating the validation functions, i.e., validation layer, from the application layer, the methods, systems and computer program products, can decrease the memory load of the public could component (or the private cloud component) of the hybrid cloud architecture, which increases application run speed in the hybrid cloud architecture.

As noted above, the methods, systems and computer program products of the present disclosure also offers machine learning feature for the cases, which in turn is used for cognitive suggestions for the primary validation rules of a target data item based on its data type. FIG. 2 illustrates at block 81 the cognitive suggestion of primary validation rules based on target item data type being provided by the machine learning feature 75 as an input to the constituent parameters 42 of the three SaaS applications 42a, 42b, 42c.

Figure 3:
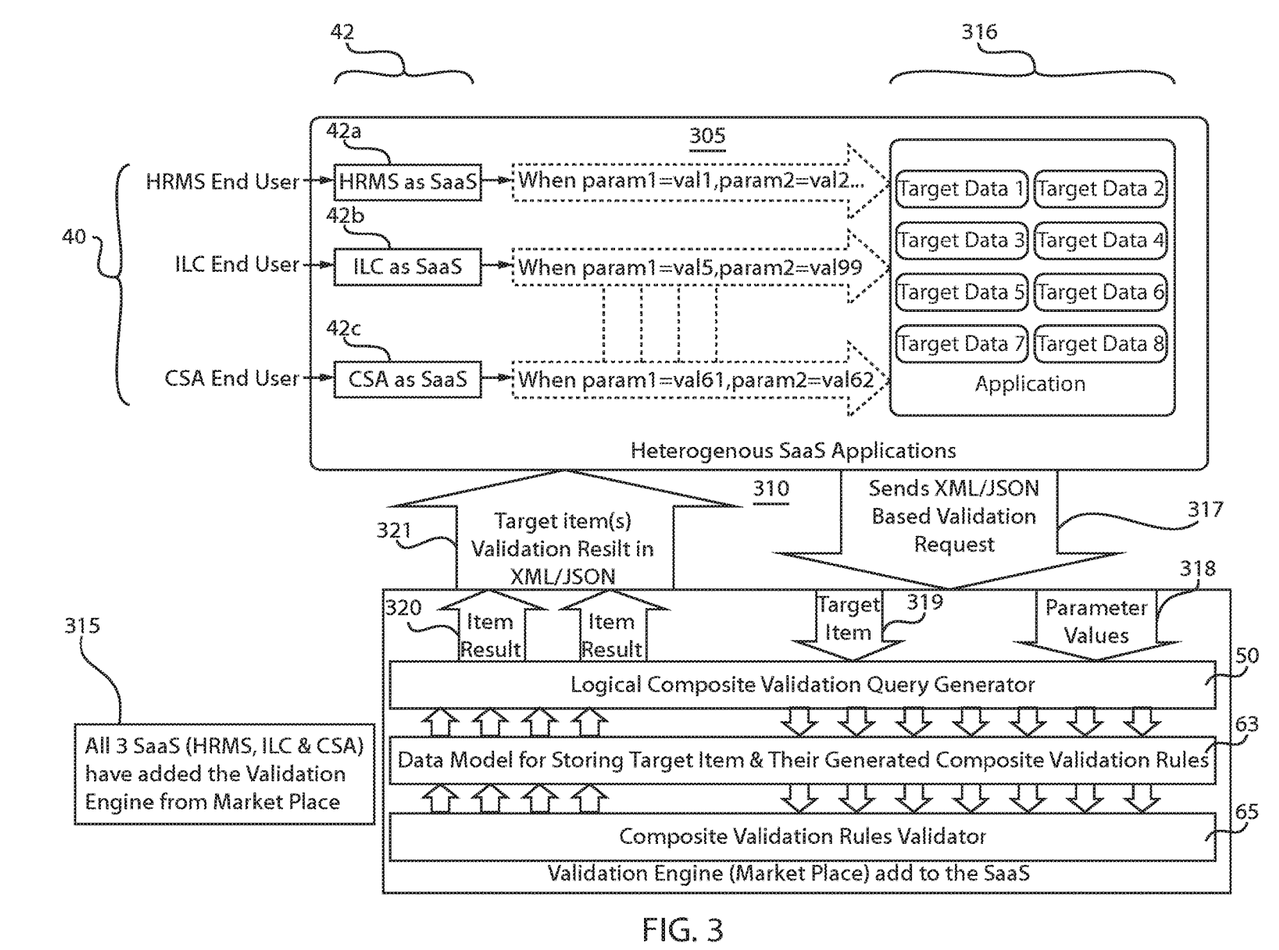
FIG. 3 is a block diagram illustrating multiple data processing applications in a cloud hybrid model which that requires data validation for data processing in a human resources management software as a service, in accordance with one embodiment of the present disclosure.

FIG. 3 is a block diagram illustrating a first case of a multiple data processing applications in a cloud hybrid model which that requires data validation for data processing using a validation layer that is separate from the application layer, as described with reference to FIGS. 1 and 2, in accordance with one embodiment of the present disclosure. In the case depicted in FIG. 3, multiple data processing applications in a cloud Hybrid Model are being depicted, which requires data validation for data processing in Cloud Hybrid model.

In the embodiment that is depicted in FIG. 3, the application layer 305 includes the software as a service (SaaS) applications. In the embodiment that is depicted in FIG. 3, the SaaS applications may include contractor sourcing application (CSA), human resources management software (HRMS), and Interlanguage communication (ILC) application.

In one example, when HRMS 42a is an SaaS application in the application layer 305, the composite validation rule being formulated by the validation engine of the validation layer 310 will be formed using constituent parameters that include employee type and employee job values role to validate a target data item.

In one example, when ILC 42b is a SaaS application in the application layer 305, the composite validation rule being formulating by the validation engine of the validation layer 310 will be formed on constituent parameters that include user type and login date values to validate a target data item.

In one example, when Contractor Sourcing Application (CSA) 42c is a SaaS application in the application layer 305, the composite validation rule will be formed on constituent parameters request state, user role, document state values to validate a target data item.

In some embodiments, for the methods, systems and computer program products provided herein, in order for validation of data types to be conducted a validation layer 310 in a hybrid cloud architecture that is separate from the application layers 305 of the hybrid cloud architecture, the SaaS Applications mentioned above need to add functions to employ the validation layer 310 as a validation engine for processing data that is separate from the applications layer 305 as a service from the market place 315. The service from the market place 315 may be employed as a brokerage.

In this application, the clients 40, also referred to as end users, though web interface, or any other caller application, can request the SaaS application 42, e.g., HRMS 42a, ILC 42b, CSA 42c, for data processing from the application layer 305 of the hybrid cloud architecture, and the validation engine of the validation layer 310 will intercept the request to dynamically identify the composite validation rule to perform validation of the target data, as described with reference to FIGS. 1 and 2.

The validation engine that is included in the validation layer 310 may include the logical composite query generator 50, the validation rules validator 65 and the machine learning feature 75 that has been described in FIGS. 1 and 2. Referring to FIG. 3, the validation engine of the validation layer 310 can validate Target Data 1 (TD1), Target Data 2 (TD2) . . . Target Data n (TD n) (collectively depicted with reference number 316) based on values of constituent parameters which is specific for each SaaS application 42, HRMS 42a, ILC 42b or CSA 42c. These three applications have different business requirement with an end user base.

FIG. 3 illustrates validation usage for HRMS 42a as SaaS 42, in which the constituent parameter values include employee type, and employee job values. The example depicted in FIG. 3 considered the validation for target data 1 (TD1) and the same applies up to . . . target data N TDN (in this case target data 8) in a concurrent processing approach supported by the validation methods described with reference to FIGS. 1 and 2 for a particular SaaS application in the Hybrid model. Same will be followed for other SaaS application.

In some embodiments, the example of data validation that is depicted in FIG. 3 can begin with an end user request, i.e., client request 40, for data processing by performing a user action, e.g., activation of function of the software as a service (SaaS), e.g., HRMS 42a as SaaS. The request is intercepted by the validation layer 310 to identify the composite validation rule to perform validation with respect to the HRMS SaaS application. For example, referring to FIG. 3 sending an XML/JSON request from the application layer 305 to the validation layer 310 is identified with reference number 317. Further details of this step are provided by blocks 5 and 10 of FIG. 1, and block 41 of FIG. 2.

In some embodiments, the Machine Learning module identified by reference number 75 in FIG. 2, cognitively suggest the validation criteria which can be applied based on the data type of TD1. The cognitive suggestion for the validation criteria is illustrated by block 81 in FIG. 2.

Referring to FIG. 3, the Logical Composite Query Generator 50 iterates and forms all possible combination of the constituent parameter values. The method steps for this stage of the process flow are described in greater detail with reference to blocks 51 through 58 of FIG. 2. FIG. 3 illustrates the target data item 318 and the parameter values 319 from the heterogeneous SaaS applications being an input to the logical composite query generator 50 of the validation engine of the validation layer 310. The Logical Composite Query Generator 50 module then appends each combination of constituent parameter values with the cognitively suggested primary validation criteria to form the composite validation criteria, as illustrated in block 59 of FIG. 2.

Referring to FIG. 3, the logical composite query generator 50 generates a composite validation rule set, e.g., similar to block 15 of FIG. 1, and block 60 of FIG. 2. Example validation rules for the data employed in the HRMS 42a SaaS depicted in FIG. 3, are as follows:

Sample Composite validation rules 1: Validate the data with X1 criteria when the values are Draft (request state), RIPC (role), in progress (document state).

Sample Composite validation rules 2: Validate the data with X2 AND X1 criteria when the values are Submitted to Buyer (request state), RIPC (role), in progress (document state)

Sample X1 criteria: field size limit, only numbers field etc.

The Composite validation criteria, i.e., validation rule set, can be stored in the data model 63 in key value pair with key as data item and value as the composite query validator rule based on constituent parameter, as illustrated in FIG. 3. This step is consistent with block 20 of FIG. 1 and block 63 of FIG. 2.

In some embodiments, an error during this generation of composite validation rule set will be captured and send to machine learning module 75 to enhance the validator rule dictionary against each data type required for cognitive suggestion.

For success case, i.e., no error during the generation of the composite validation rule, the validator engine will validate the key data item TD1 against the generated composite rule set and return the result in JSON/XM1 format back to the application. This step is consistent with validating the target data item of the target object values with the composite validation rule in the validation rules validator (VRV) component at block 25 of FIG. 1. Validation of the data is further described with reference to block 66 through 70 of FIG. 3.

FIG. 3 further illustrates sending a response back, i.e., item result, which may include validated data to the requestee software as a service (SaaS) application at reference numbers 319 and 320. The response from the validation layer 310 to the application layer 305 may be a target item validation result in XML/JSON at reference number 320. In some embodiments, this can provide block 30 of FIG. 1, which includes sending validation to the application. In some embodiments, the validation rules validator 65 can return the validation results to the composite query generator (LCQG) 50, which in turn will return the results to the application layer 305.

Figure 4:
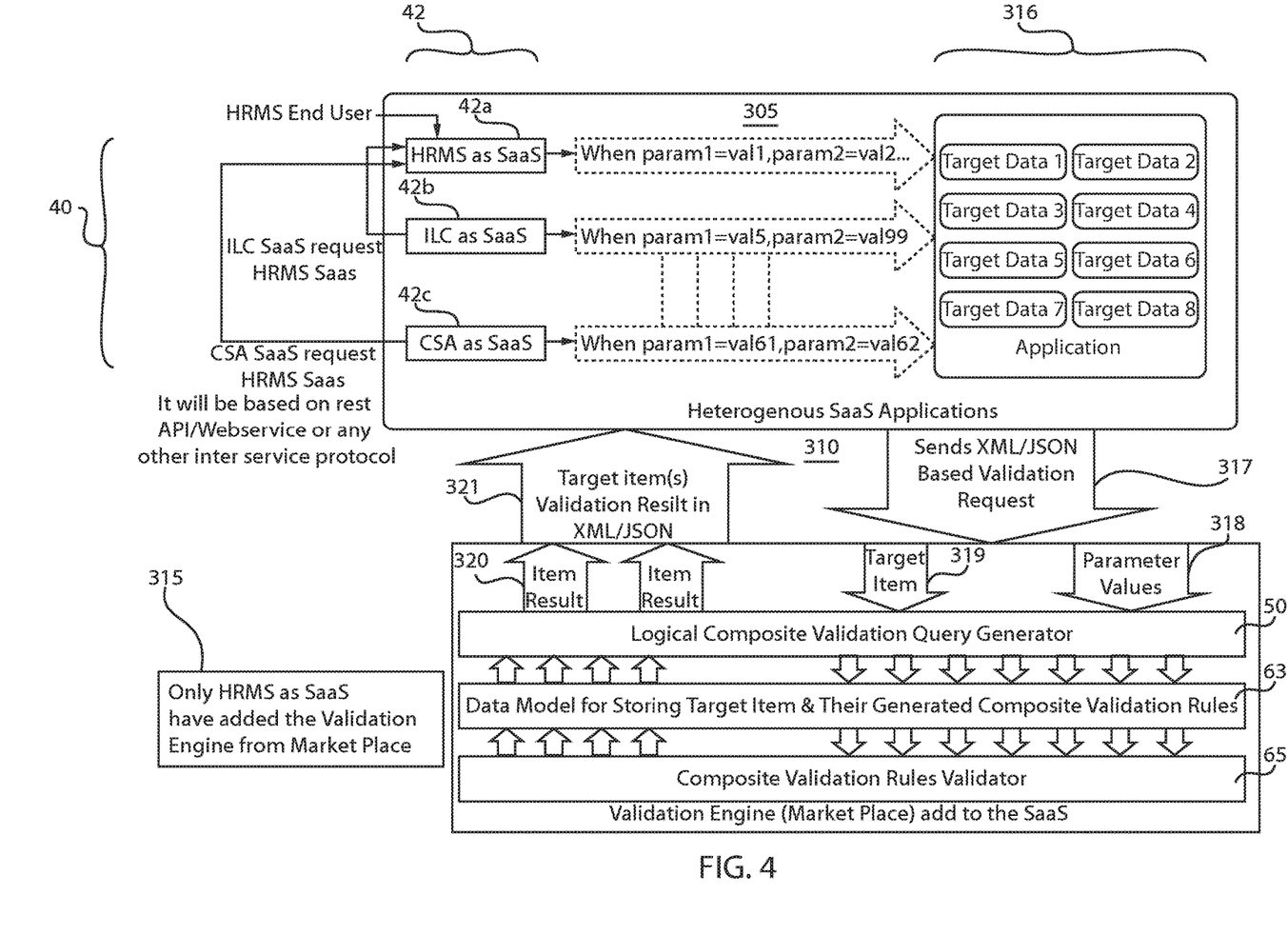
FIG. 4 is a block diagram illustrating multiple data processing applications in a cloud hybrid model which illustrates data processing by the applications, and data validation by the validation engine of the validation layer, in accordance with one embodiment of the present disclosure.

In some embodiments, outside the validation layer 310, the requestee SaaS application will parse the returned XML/JSON and will retrieve the necessary validation result corresponding to the target data item for further processing. In some embodiments, the same will be followed for ILC as SaaS and CSA as SaaS since they have added this Validation engine when request for data processing is forwarded to respective SaaS applications FIG. 4 is a block diagram illustrating a second example of multiple data processing applications in a cloud hybrid model which that requires data validation for data processing using a validation layer that is separate from the application layer, as described with reference to FIGS. 1 and 2. In the example depicted in FIG. 4, a multiple data processing application is considered in a cloud Hybrid Model, wherein one of which requires data validation for data processing in Cloud Hybrid model, while an end user or other SaaS application request data processing. For this case, in can be assumed that HRMS 42a as SaaS 40 uses the validation engine within the validation layer 310 as it receives data processing request from end user, i.e., client 40, through GUI as well from other SaaS applications such as ILC 42b as SaaS and CSA 42c as SaaS for data processing. It is noted that the remainder of the method and system depicted in FIG. 4 is similar to the method and system that is depicted in FIG. 3. Therefore, the blocks having reference numbers in FIG. 4 that are same as the blocks having the same reference numbers in FIG. 3 may share the same description.

Figure 5:
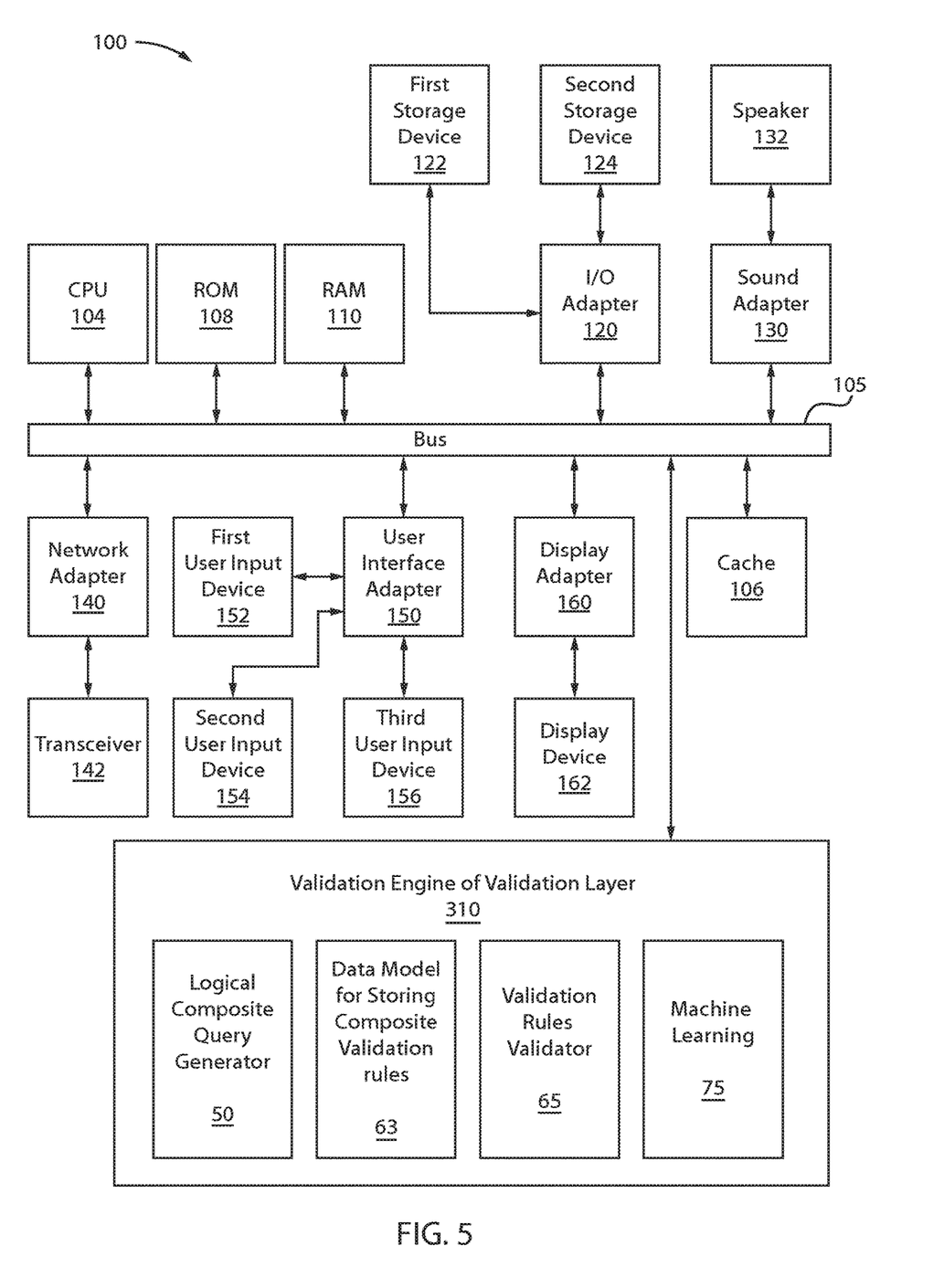
FIG. 5 is a block diagram of a system for validating data in a hybrid cloud model, in accordance with one embodiment of the present disclosure.

FIG. 5 is a block diagram of a system for validating data in a hybrid cloud model, in which the system includes a validation engine of a validation layer 310. The system for validating data in a hybrid cloud model includes a validation layer 310, i.e., a device for providing a validation layer in a hybrid could architecture. The validation layer 310 may be a component of a brokerage module of the hybrid architecture. The validation layer being separate from the applications layer. The validation layer 310, and the associated validation engine, have been described in greater detail with reference to FIGS. 1-3.

In some embodiments, a centralized brokerage layer composite query generator (BLCQG) component 50 (also referred to as logical composite query component 50) of the validation layer 310 for receiving target object values from an application needing validation of target data time and generating a composite validation rule set with the brokerage layer composite query generator (BLCQG) component 50 based on the parameters of the target object values from the application needing validation of data. The logical composite query generator component 50 has functions further described with reference to FIGS. 1-4. To provide the functions for the logical composite query component 50, the method steps and operations described in FIGS. 1-4 may be stored in a form of memory, in which the centralized brokerage layer composite query generator (BLCQG) component 50 may effectuate the method steps and operations described in FIGS. 1-4 via hardware processors functioning in response to the steps and instructions stored on the memory.

The system for validating data in the hybrid cloud model, in which the system includes a validation engine of a validation layer 310 that is separate from the application layer of the hybrid cloud model, may also include a data model for storing composite validation rule(s) per target data item in key value format, which is identified by reference number 36. The function of the data model 36 has been described in more detail with reference to FIGS. 1-4. The data model 36 for storing the composite validation rule(s) may be provided by at least one form of memory device configured to provide the functions of the data model 36 that have been described with reference to FIGS. 1-4.

Still referring to FIG. 5, the system for validating data in the hybrid cloud model that includes a validation engine of a validation layer 310 can further include a validation rules validator (VRV) 65 for validating the target data item of the target object values with the composite validation rules. The validation rules validator (VRV) 65 has functions further described with reference to FIGS. 1-4. To provide the functions for the validation rules validator (VRV) 65, the method steps and operations described in FIGS. 1-4 may be stored in a form of memory, in which the validation rules validator (VRV) 65 may effectuate the method steps and operations described in FIGS. 1-4 via hardware processors functioning in response to the steps and instructions stored on the memory.

The system for validating data depicted in FIG. 5 may further include a machine learning feature 75. The methods and functions of the machine learning feature 75 have been described in greater detail with reference to FIGS. 1-4. The machine learning feature can include some form of artificial intelligence. Each of the aforementioned components of the system for validating data in a hybrid cloud model are connected by a bus 105. The bus 105 further provides that the validation engine of the validation layer 310, and its components, can be part of a system 100 system for validating data in a hybrid cloud model, as depicted in FIG. 5.

For example, the system 100 that is depicted in FIG. 5, includes at least one processor (CPU) 104, e.g., hardware processor device, a cache 106, a Read Only Memory (ROM) 108, a Random Access Memory (RAM) 110, an input/output (I/O) adapter 120, a sound adapter 130, a network adapter 140, a user interface adapter 150, a display 30 and a display adapter 160, which are all operatively coupled to the system bus 105 of the system 100.

A first storage device 122 and a second storage device 124 are operatively coupled to system bus 105 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to system bus 105 by the sound adapter 130. A transceiver 142 is operatively coupled to system bus 105 by network adapter 140. A display 30 is operatively coupled to system bus 105 by display adapter 160.

A first user input device 152, a second user input device 154, and a third user input device 156 are operatively coupled to system bus 105 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present invention. The user input devices 152, 154, and 156 can be the same type of user input device or different types of user input devices. The user input devices 152, 154, and 156 are used to input and output information to and from system 100.

The method described in FIGS. 1-4 may be embodied as a computer program product. In one embodiment, a computer program product is provided including a non-transitory computer readable storage medium having computer readable program code embodied therein for validating data in a hybrid cloud model. The validating data method on the non-transitory computer readable storage medium may include providing a validation layer in the brokerage module of the hybrid architecture, the validation layer being separate from the applications layer; and sending target object values to a centralized brokerage layer composite query generator (BLCQG) component of the validation layer from an application needing validation of target data time. The method of the computer program product may further include generating a composite validation rule set with the brokerage layer composite query generator (BLCQG) component based on the parameters of the target object values from the application needing validation of data; validating the target data item of the target object values with the composite validation rule in a validation rules validator (VRV) component; and sending the target data item that has been validated to the application.

The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

It is understood that this disclosure includes a detailed description on cloud computing, implementation of the teachings recited herein are not limited to a cloud computing environment. Rather, embodiments of the present invention are capable of being implemented in conjunction with any other type of computing environment now known or later developed.

The methods of the present disclosure may be practiced using a cloud computing environment, e.g., hybrid cloud computing environment. Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models. Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 6:
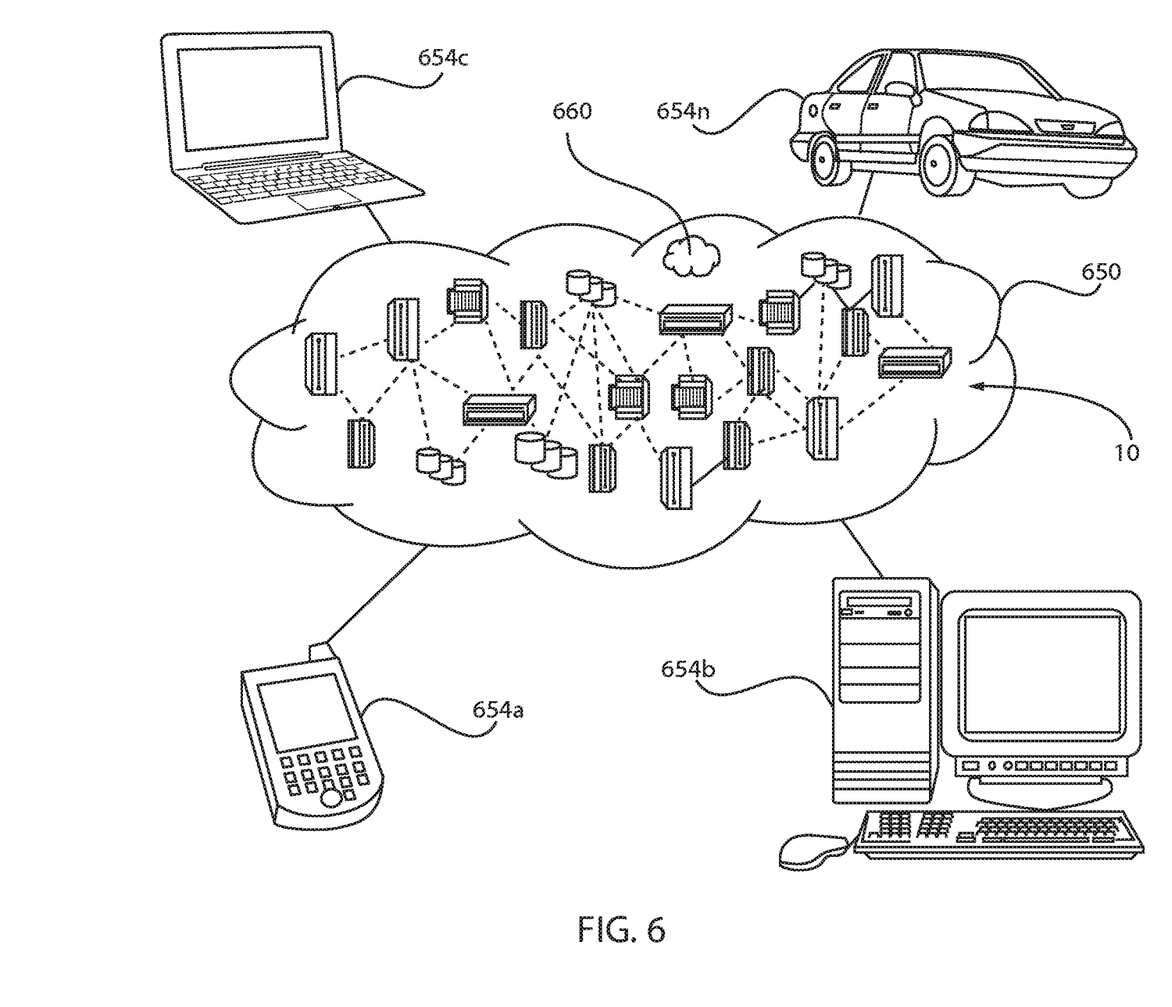
FIG. 6 depicts a cloud computing environment according to an embodiment of the present disclosure.

Referring now to FIG. 6, illustrative cloud computing environment is depicted. As shown, cloud computing environment 600 includes one or more cloud computing nodes with which local computing devices used by cloud consumers, such as, for example, mobile and/or wearable electronic devices 654A, desktop computer 654B, laptop computer 654C, and/or automobile computer system 654N may communicate. Nodes may communicate with one another. They may be grouped (not shown) physically or virtually, in one or more networks, such as Hybrid clouds as described hereinabove, or a combination thereof. The hybrid cloud includes a public cloud 650 and a private cloud 660. This allows cloud computing environment 600 to offer infrastructure, platforms and/or software as services for which a cloud consumer does not need to maintain resources on a local computing device. It is understood that the types of computing devices 654A-N shown in FIG. 6 are intended to be illustrative only and that computing nodes and cloud computing environment 600 can communicate with any type of computerized device over any type of network and/or network addressable connection (e.g., using a web browser).

Figure 7:
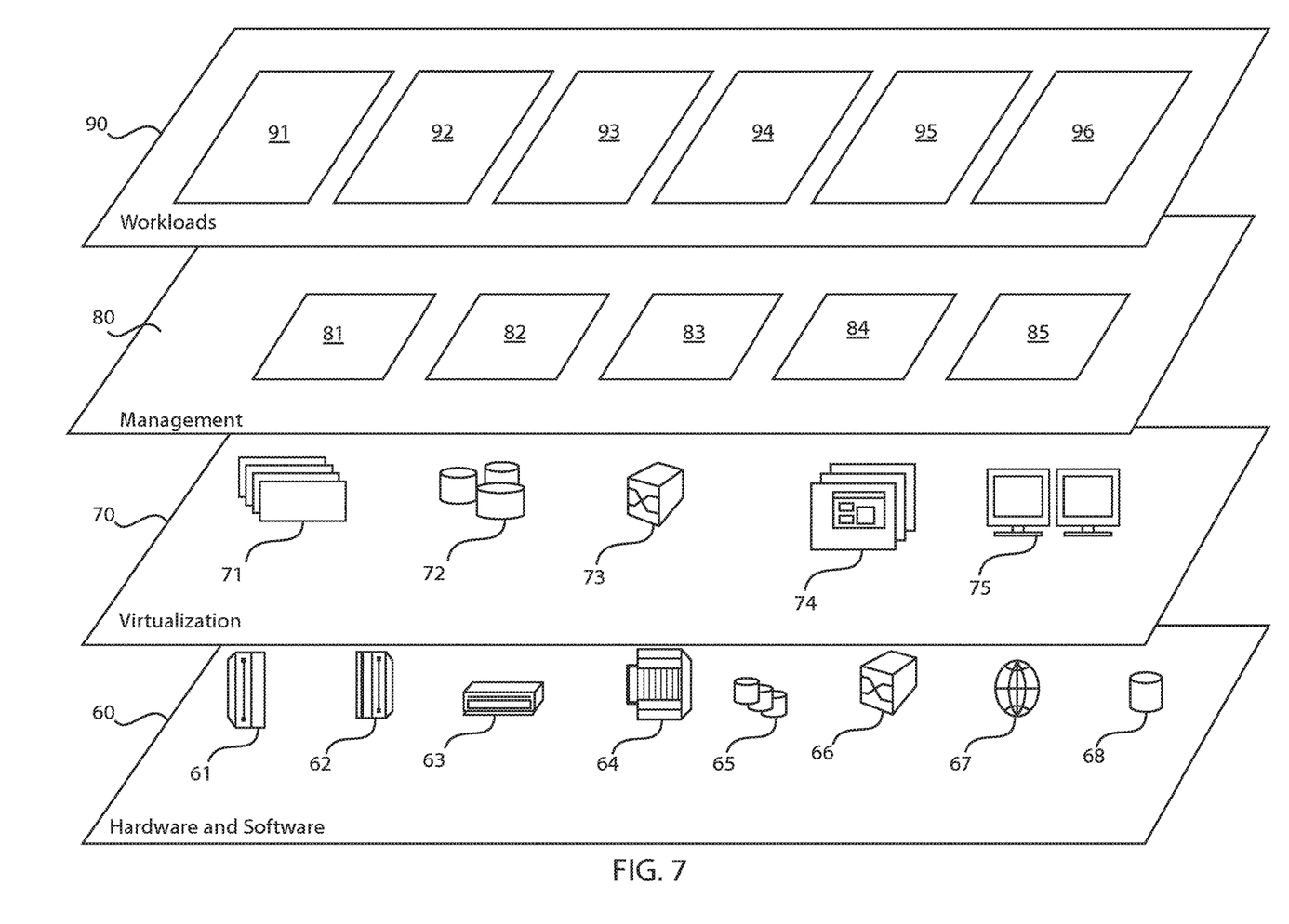
FIG. 7 depicts abstraction model layers according to an embodiment of the present disclosure.

Referring now to FIG. 7, a set of functional abstraction layers provided by cloud computing environment 600 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; software as a service (Saas) application layer 95; and a service for validating data in the hybrid cloud model having a validation engine of a validation layer 310 is separate from the application layer of the hybrid cloud model, which is described with reference to FIGS. 1-5.

Having described preferred embodiments of a multiple parameter based composite rule wise data validation cloud hybrid model, it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A computer implemented method for validating data in a hybrid cloud model, the computer implemented method employing a processor to cause the processor to execute the method comprising:

providing a cloud validation layer in a brokerage module that manages relationships between different cloud providers of a hybrid cloud architecture using the processor, the cloud validation layer being separate from a cloud applications layer and is separate from an infrastructure layer;

sending target object values to composite query generator (CQG) component of the cloud validation layer from an application needing validation of a target data item, wherein the cloud validation layer employs a validation rule dictionary produced from machine learning of prior validation steps to append validator logic to the target object values;

generating a composite validation rule set with the composite query generator (CQG) component based on the parameters of the target object values from the application needing validation of data, the composite validation rule set being stored in a data model for storing the composite validation rules on the cloud validation layer;

validating the target data item of the target object values with the composite validation rule in a validation rules validator (VRV) component; and sending the target data item that has been validated to the application.

2. The computer implemented method of claim 1, further comprising storing the composite validation rule set in a data model.

3. The computer implemented method of claim 1, further comprising employing machine learning to provide cognitive suggestions of primary validation rules.

4. The computer implemented method of claim 1, wherein separation of the validation layer from the applications layer allows for the validation layer to function independently of the applications layer.

5. The computer implemented method of claim 4, wherein the applications layer includes software as a service (SaaS) applications.

6. The computer implemented method of claim 5, wherein said validating the target data item of the target object values for a heterogeneous software as service (SaaS) based applications can be performed in the validation layer without using logic processes from the applications layer.

7. The computer implemented method of claim 1, wherein said sending the target object values to the composite query generator (CQG) component of the validation layer comprises a message in XML or JSON.

8. A system for validating data in a hybrid cloud model comprising:
   a cloud validation layer in a brokerage module of a hybrid cloud architecture that manages relationships between different cloud provider of the hybrid cloud architecture, the cloud validation layer being separate from a cloud applications layer and is separate from an infrastructure layer;
   a composite query generator (CQG) component of the validation layer for receiving target object values from an application needing validation of a target data item and generating a composite validation rule set with the composite query generator (CQG) component based on the parameters of the target object values from the application needing validation of data, wherein the cloud validation layer employs a validation rule dictionary produced from machine learning of prior validation steps to append validator logic to the target object values; and
   a validation rules validator (VRV) for validating the target data item of the target object values with the composite validation rule; and
   a data model for storing the composite validation rules on the cloud validation layer.

9. The system of claim 8, further comprising a data model for storing the composite validation rule.

10. The system of claim 8, further comprising a machine learning processor device to provide cognitive suggestions of primary validation rules to the composite query generator.

11. The system of claim 10, wherein separation of the validation layer from the applications layer allows for the validation layer to function independently of the applications layer.

12. The system of claim 11, wherein the applications layer includes software as a service (SaaS) applications.

13. The system of claim 12, wherein said validating the target data item of the target object values for a heterogeneous software as service (SaaS) based applications can be performed in the validation layer without using logic processes from the applications layer.

14. The system of claim 13, wherein said sending the target object values to a centralized brokerage layer composite query generator (BLCQG) component of the validation layer comprises a message in XML or JSON.

15. A computer program product comprising a non-transitory computer readable storage medium having computer readable program code embodied therein for validating data in a hybrid cloud model, the computer readable program code executable by a processor to cause the processor to:
   provide, using the processor, a cloud validation layer in the brokerage module of a cloud hybrid architecture that manages relationships between different cloud provider of the hybrid cloud architecture, the cloud validation layer being separate from a cloud applications layer and is separate from an infrastructure layer;
   send, using the processor, target object values to a composite query generator (CQG) component of the cloud validation layer from an application needing validation of a target data item, wherein the cloud validation layer employs a validation rule dictionary produced from machine learning of prior validation steps to append validator logic to the target object values;
   generate, using the processor, a composite validation rule set with the composite query generator (CQG) component based on the parameters of the target object values from the application needing validation of data, the composite validation rule set being stored in a data model for storing the composite validation rules on the cloud validation layer;
   validate, using the processor, the target data item of the target object values with the composite validation rule in a validation rules validator (VRV) component; and
   send, using the processor, the target data item that has been validated to the application.

16. The computer program product of claim 15, further comprising storing the composite validation rule in a data model.

17. The computer program product of claim 15, wherein separation of the validation layer from the applications layer allows for the validation layer to function independently of the applications layer.

18. The computer program product of claim 15, wherein the applications layer includes software as a service (SaaS) applications.

19. The computer program product of claim 15, wherein said validating the target data item of the target object values for a heterogeneous software as service (SaaS) based applications can be performed in the validation layer without using logic processes from the applications layer.

20. The computer program product of claim 15, wherein said sending the target object values to the composite query generator (CQG) component of the validation layer comprises a message in XML or JSON.

* * * * *